United States Patent
Morse et al.

(10) Patent No.: US 6,432,018 B1
(45) Date of Patent: Aug. 13, 2002

(54) INTEGRATED HEAT EXCHANGE CIRCUIT FOR AN AXLE

(75) Inventors: David M. Morse, Waterford; Michael J. Bommarito, Lake Orion, both of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 11 days.

(21) Appl. No.: 09/742,828

(22) Filed: Dec. 20, 2000

(51) Int. Cl.[7] .............................................. F16H 57/04
(52) U.S. Cl. ..................................... 475/161; 74/606 A
(58) Field of Search .......................... 475/161; 74/606 A

(56) References Cited

U.S. PATENT DOCUMENTS

| | | | |
|---|---|---|---|
| 2,687,784 A | * 8/1954 | Klackner | .................. 74/606 A |
| 3,770,074 A | 11/1973 | Sherman | |
| 4,352,301 A | 10/1982 | Fleury | |
| 4,461,373 A | 7/1984 | Pratt et al. | |
| 4,655,326 A | 4/1987 | Osenbaugh | |
| 4,915,193 A | * 4/1990 | Hayashida et al. | ........ 74/606 A |
| 4,958,537 A | * 9/1990 | Diehl et al. | ............... 74/606 A |
| 5,190,123 A | 3/1993 | Hvolka | |
| 5,316,106 A | 5/1994 | Baedke et al. | |
| 5,535,850 A | 7/1996 | Tar et al. | |
| 5,540,300 A | 7/1996 | Downs et al. | |
| 5,584,773 A | 12/1996 | Kershaw et al. | |
| 5,622,051 A | 4/1997 | Iida et al. | |
| 5,839,327 A | 11/1998 | Gage | |
| 5,931,218 A | 8/1999 | Carlson et al. | |

* cited by examiner

*Primary Examiner*—Dirk Wright
(74) *Attorney, Agent, or Firm*—Harness, Dickey & Pierce P.L.C.

(57) ABSTRACT

A drive line power transfer mechanism having a housing, a power transfer mechanism, a first fluid, at least one cooling conduit and a fluid source. The housing has a wall member that defines a cavity. The power transfer mechanism is positioned within the cavity. The first fluid is at least partially contained within a cavity. The first fluid lubricates and extracts heat from the power transfer mechanism during the operation of the drive line power transfer mechanism. The cooling conduit is formed within the wall member. The fluid source is in fluid communication with the fluid conduit and passes a second fluid through the cooling conduit to draw heat out of the housing that is generated by the operation of the drive line power transfer mechanism. A method for cooling an axle assembly is also provided.

24 Claims, 4 Drawing Sheets

INTEGRATED HEAT EXCHANGE CIRCUIT FOR AN AXLE

BACKGROUND OF THE INVENTION

1. Technical Field

The present invention generally relates to drive line power transfer mechanisms and more particularly to drive line power transfer mechanisms that include a cooling system.

2. Discussion

Modern vehicles typically include an axle assembly having a housing and a differential assembly. The housing includes a cavity into which the differential assembly is positioned. The differential assembly is rotatably supported by the housing within the cavity. The differential assembly is mechanically coupled to the vehicle engine by a drive shaft. The differential assembly is also coupled to the vehicle drive wheels via a pair of axle shafts. The differential assembly regulates drive torque between the axle shafts, thereby permitting the shafts to rotate at different velocities as when the vehicle is operated in a cornering maneuver.

During the operation of the vehicle, friction between the various components of the axle assembly can cause the components to heat up and decrease the useful life of the components of the axle assembly. One solution that has been proposed is the circulation of a lubricating fluid through a heat exchanger located remotely from the axle assembly. One drawback associated with this approach is that due to the viscosity of the axle assembly lubricating fluid, this fluid is difficult to pump to a remote location, particularly when the ambient temperature is relatively cold.

Another solution that has been proposed is the use of a separate heat exchanger within the cavity of the axle housing. The heat exchanger is mounted to the interior of the axle housing such that it is suspended within a pool of lubricating fluid. One drawback associated with this approach is that any fluid that leaks from the heat exchanger will contaminate the lubricating fluid. In severe cases, the lubricating characteristics of the lubricating fluid can be destroyed if a sufficient quantity of fluid leaks from the heat exchanger.

Accordingly, the remains in need art for an axle assembly having an improved cooling system that provides adequate cooling of the axle lubricant while minimizing the risk of contamination of the axle lubricant in the event of a coolant leak.

SUMMARY OF THE INVENTION

In one preferred form, the present invention provides a drive line power transfer mechanism having a housing, a power transfer mechanism, a first fluid, at least one cooling conduit and a fluid source. The housing has a wall member that defines a cavity. The power transfer mechanism is positioned within the cavity. The first fluid is at least partially contained within a cavity. The first fluid lubricates and extracts heat from the power transfer mechanism during the operation of the drive line power transfer mechanism. The cooling conduit is formed within the wall member. The fluid source is in fluid communication with the fluid conduit and passes a second fluid through the cooling conduit to draw heat out of the housing that is generated by the operation of the drive line power transfer mechanism. A method for cooling an axle assembly is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
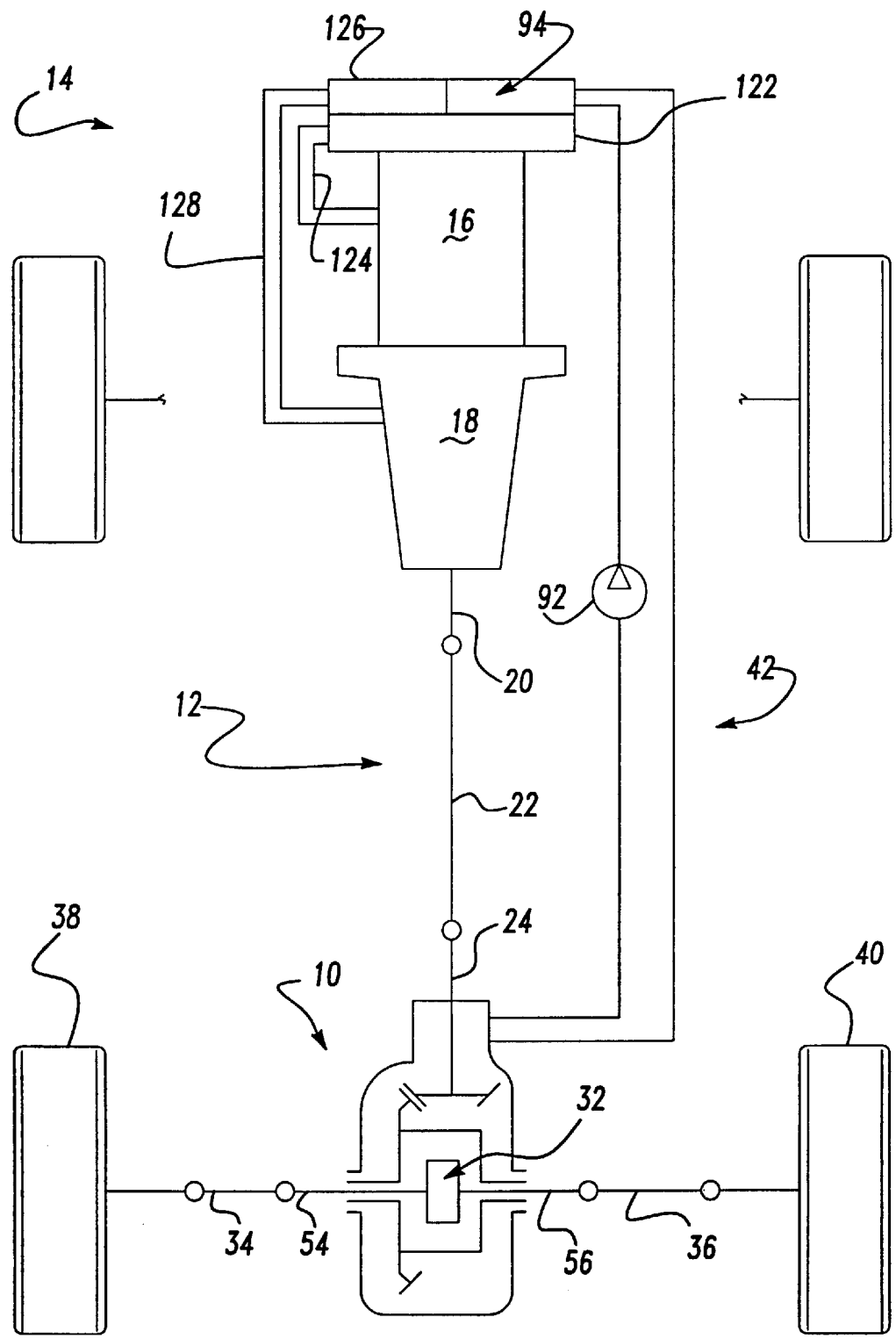
FIG. 1 is a schematic view of an exemplary motor vehicle into which an axle assembly constructed in accordance with the teachings of the present invention is incorporated.

With reference to FIG. 1 of the drawings, an axle assembly constructed in accordance with the teachings of the present invention is generally indicated by reference numeral 10. The axle assembly 10 is illustrated to form a portion of a drive train 12 for an exemplary motor vehicle 14. The drive train 12 is also shown to include an engine 16, a transmission 18 having an output shaft 20 and a propeller shaft 22 connecting the output shaft 20 to a pinion shaft 24 of the axle assembly 10.

Figure 2:
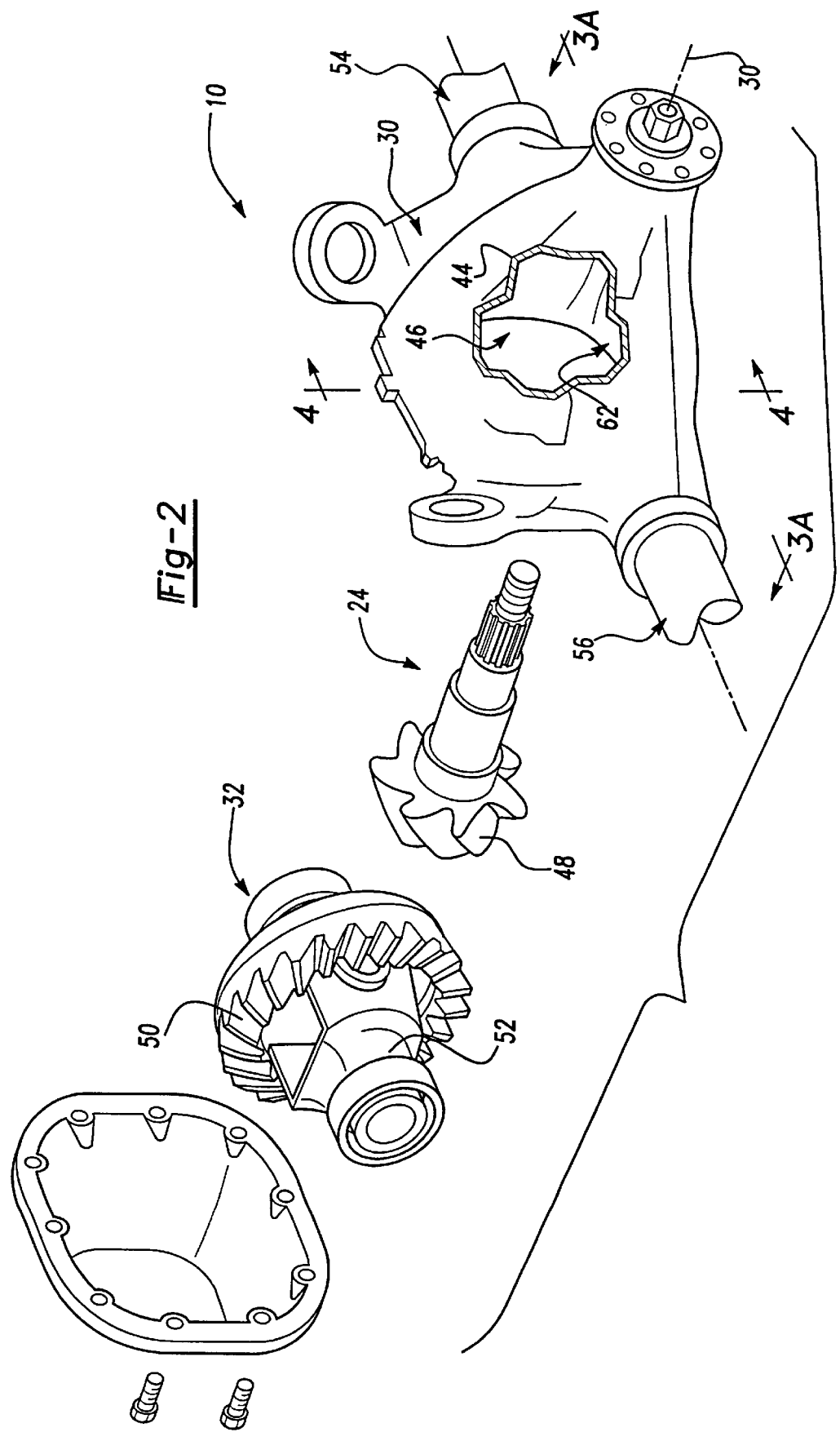
FIG. 2 is an exploded perspective view of the axle assembly of FIG. 1.

With additional reference to FIG. 2, the axle assembly 10 includes an axle housing 30, a differential assembly 32, a pair of axle shafts 34 and 36 that are interconnected to left and right drive wheels 38 and 40, respectively and a fluid source 42. The axle housing 30 has a wall member 44 that defines a differential cavity 46 into which the differential assembly 32 is rotatably supported. The pinion shaft 24 has a pinion gear 48 that is fixed thereto which drives a ring gear 50 that is fixed to a differential case 52 of the differential assembly 32. A gearset (not specifically shown) supported within the differential case 52 transfers rotary power from the differential case 52 to a pair of output shafts 54 and 56 that are coupled to the axle shafts 34 and 36, respectively, and facilitate relative rotation (i.e., differentiation) therebetween. Thus, rotary power form the engine 16 is transmitted to the output shafts 54 and 56 for driving the left and right drive wheels 38 and 40 via the transmission 18, the propeller shaft 22, the pinion shaft 24, the differential case 52 and the differential gearset. Those skilled in the art will understand that although the axle assembly is shown in a rear-wheel drive application, the teachings of the present invention may be incorporated into trailing axles, transaxles for use in front-wheel drive vehicles, transfer cases for use in four-wheel drive vehicles and/or any other known driveline application.

During the operation of the axle assembly 10, friction is generated between the various components of the axle assembly 10. A lubricant 60 is employed to reduce the level of friction between the components of the axle assembly 10, as well as to extract heat from the differential assembly 32. The lubricant 60 collects in a lubricant pooling portion 62 of the differential cavity 46, thereby permitting the lubricant 60 to splash onto the differential assembly 32 as well as to conduct heat to the axle housing 30.

Figure 3A:
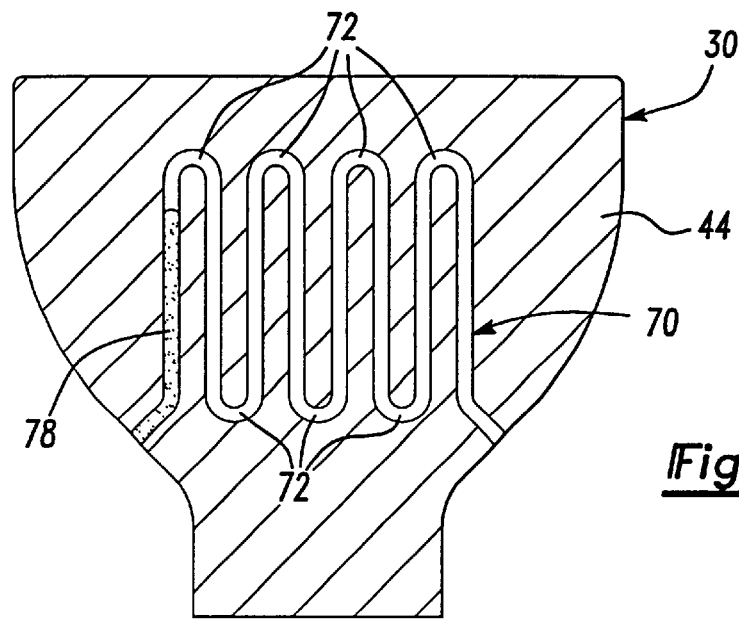
FIG. 3A is a sectional view of the axle assembly taken along the line 3A—3A of FIG. 2.

In FIG. 3A, the axle housing 30 is shown to include at least one cooling conduit 70 that is formed in the wall member 44. In the particular embodiment illustrated, the cooling conduit 70 is defined by a plurality of U-shaped bends 72 that are wholly formed within the wall member 44. The cooling conduit 70 facilitates the circulation of a cooling fluid through the axle housing 30 in a manner that will be discussed in detail, below. As shown, the cooling conduit 70 is formed in the wall member 44 with a removable tool, such as a wash-out mandrel 78 formed from salt (partially illustrated), when the axle housing 30 is cast.

Figure 3B:
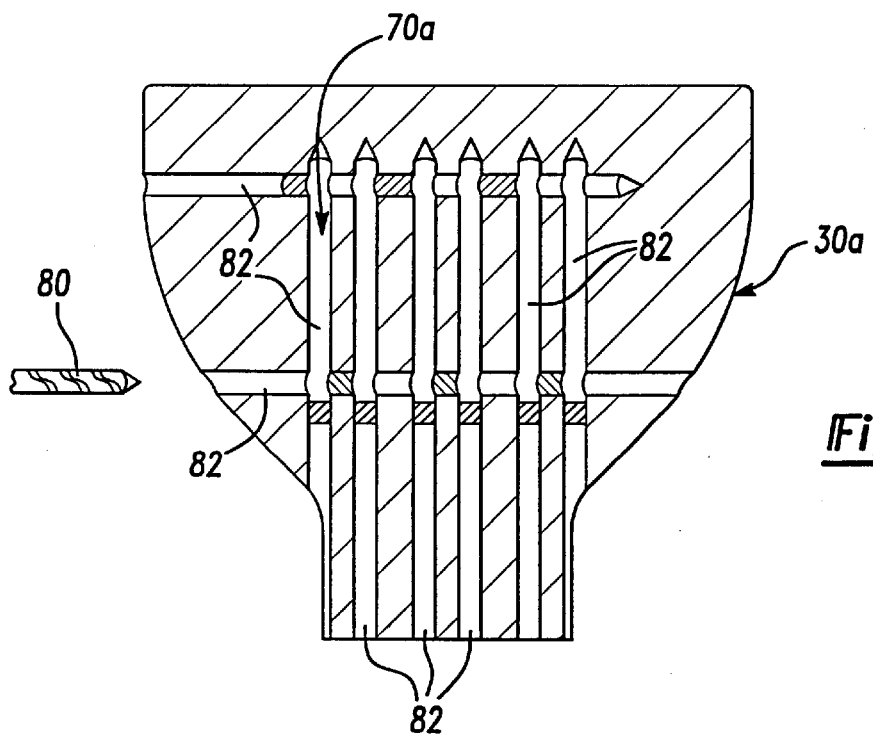
FIG. 3B is a sectional view similar to that of FIG. 3A but illustrating an alternate construction technique for forming the coolant conduit in the housing.
Figure 3C:
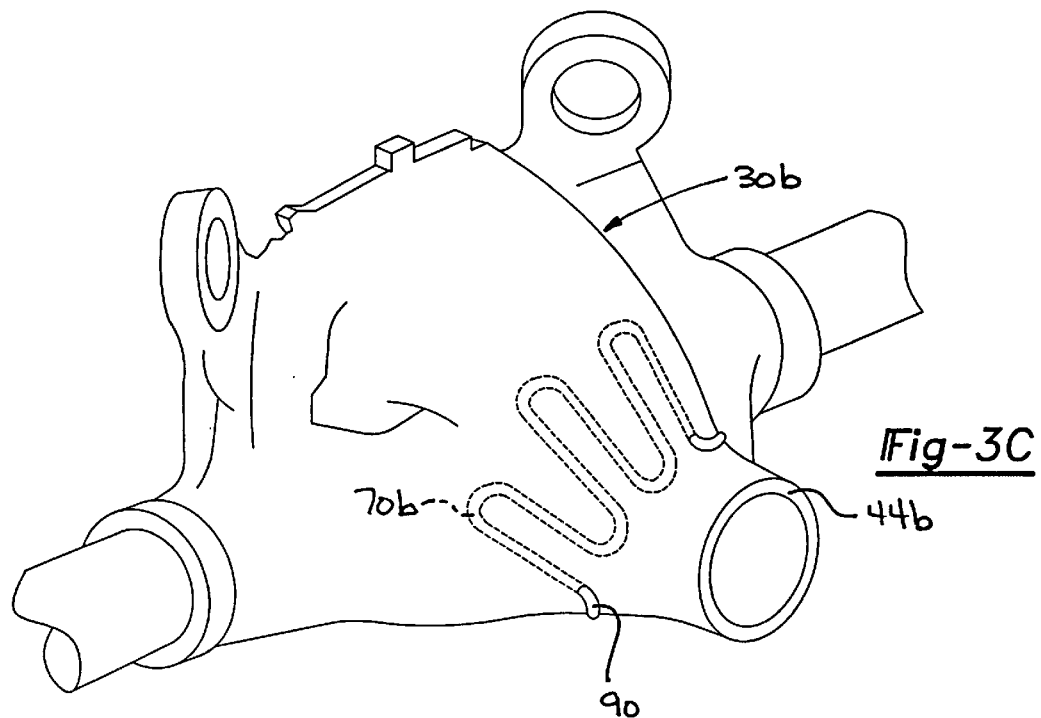
FIG. 3C is a perspective view illustrating a second alternate construction technique for forming the cooling conduit in the housing.

Alternatively, the cooling conduit 70 may be formed as shown in FIGS. 3B and 3C. In FIG. 3B, the cooling conduit 70a is formed with a rotary cutting tool, such as a drill 80, in a machining operation. The rotary cutting tool is operable for cutting a plurality of coolant passages 82 into the axle housing 30a, which are subsequently plugged at predetermined locations to cause a coolant to flow through the axle housing 30a in a predetermined manner. In FIG. 3C, the cooling conduit 70b is formed from a pre-formed tube assembly 90 which is cast directly into the wall member 44b that forms the axle housing 30b. Those skilled in the art will also understand that the plurality of coolant passages 82 may be formed using a lost-foam process wherein the axle housing 30 is formed by several layers of pre-formed foam, with two layers of the foam intersecting and defining the plurality of coolant passages 82. A suitable material, such as sand, is packed into the portion of the coolant passages 82 that is formed into each of the layers of foam and the layers of foam are stacked upon one another. When molten metal is introduced to the mold, the metal replaces the foam, permitting the material (e.g., sand) that was between the layers of foam to form the plurality of coolant passages 82. The material in the plurality of coolant passages 82 is thereafter washed out.

Figure 4:
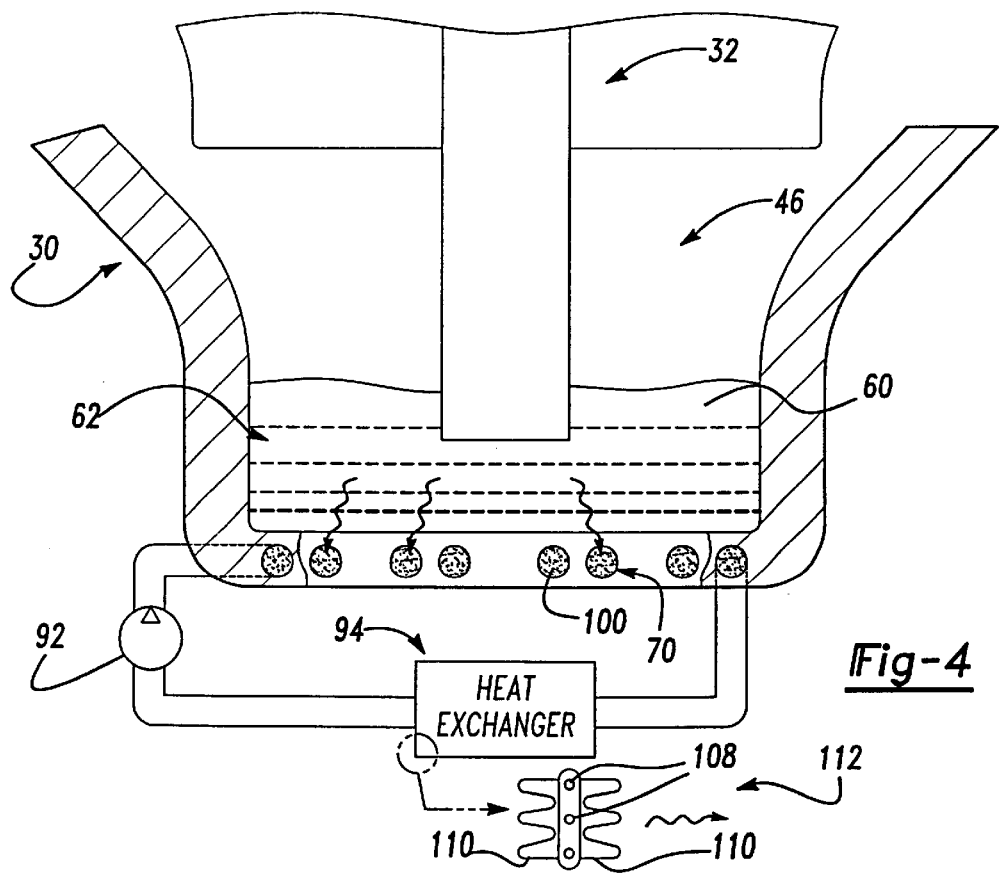
FIG. 4 is a schematic view of the axle assembly of FIG. 1 illustrating the fluid source in greater detail.

In FIG. 4, the operation of the axle assembly 10 is illustrated. The fluid source 42 is illustrated to be in fluid communication with the cooling conduit 70. In the particular example illustrated, the fluid source 42 includes a fluid pump 92 for circulating a coolant 100 and a heat exchanger 94 for extracting at least a portion of the heat that is absorbed by the coolant 100.

Heated lubricant 60 is shown to collect in the lubricant pooling portion 62 of the differential cavity 46 and conduct into the axle housing 30. The heat absorbed by the axle housing 30 is transmitted to the coolant conduit 70 where it is absorbed by the coolant 100. The pump 92 circulates the coolant 100 from the cooling conduit 70 to the heat exchanger 94 where at least a portion of the heat absorbed by the coolant 100 is rejected. Preferably, the heat exchanger 94 includes a plurality of tubes 108 and a plurality of fins 110. The tubes 108 conduct heat from coolant 100 to the fins 110, where it is then rejected to the air 112 proximate the heat exchanger 94. Preferably, the heat exchanger 94 is part of a multi-fluid heat exchanger 94 (illustrated in FIG. 1) that is employed to reject heat from a plurality of vehicle fluids. In the particular example provided, the multi-fluid heat exchanger 94 also includes a portion 122 that facilitates the rejection of heat from an engine coolant 124 and a portion 126 that facilitates the rejection of heat from an automatic transmission fluid 128.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A drive line power transfer mechanism comprising:
   a housing having a wall member that defines a cavity;
   a power transfer mechanism positioned in the cavity;
   a first fluid at least partially contained with the cavity, the first fluid operable for lubricating and extracting heat from the power transfer mechanism;
   at least one coolant conduit formed in the wall member; and
   a fluid source in fluid communication with the at least one cooling conduit;
   wherein the fluid source passes a second fluid through the cooling conduit to draw heat of the housing that is generated by the operation of the drive line power transfer mechanism.

2. The drive line power transfer mechanism of claim 1, wherein the cooling conduit is at least partially formed by a rotary cutting tool.

3. The drive line power transfer mechanism of claim 1, wherein the cooling conduit is at least partially formed with removable tooling when the housing is cast.

4. The drive line power transfer mechanism of claim 3, wherein the removable tooling is a wash out mandrel formed from salt.

5. The drive line power transfer mechanism of claim 1, wherein the cooling conduit is at least partially formed with a formed foam insert when the housing is cast.

6. The drive line power transfer mechanism of claim 1, wherein no portion of the at least one cooling conduit extends into the cavity.

7. The drive line power transfer mechanism of claim 1, wherein the fluid source includes a heat exchanger for rejecting at least a portion of the heat received by the second fluid.

8. The drive line power transfer mechanism of claim 1, wherein the first and second fluids are different.

9. The drive line power transfer mechanism of claim 1, wherein the cooling conduit is at least partially defined a plurality of U-shaped bends.

10. The drive line power transfer mechanism of claim 1, wherein the fluid source further includes a fluid pump.

11. The drive line power transfer mechanism of claim 1, wherein the cooling conduit is at least partially formed by a tube assembly that is cast into the housing.

12. The drive line power transfer mechanism of claim 1, wherein the power transfer mechanism is a differential assembly.

13. An axle assembly comprising:
   housing having a wall member that defines a differential cavity, the differential cavity including a lubrication cooling portion;
   a differential assembly positioned in the differential cavity;
   a first fluid at least partially disposed within the differential cavity, the first fluid collecting in the lubricant cooling and transmitting heat to the housing;
   at least one cooling conduit formed into the wall member; and a fluid source in fluid communication with the cooling conduit, the fluid source including a second fluid, a pump and a heat exchanger, the pump circulating the second fluid through the cooling conduit and the heat exchanger, the second fluid extracting heat from the housing as the second passes through the cooling conduit and rejecting at least a portion of the heat to a third fluid when the second fluid passes through a heat exchanger.

14. The axle assembly of claim 13, wherein the cooling conduit is at least partially formed by a rotary cutting tool.

15. The axle assembly of claim 13, wherein the cooling conduit is at least partially formed with removable tooling when the housing is cast.

16. The axle assembly of claim 13, wherein the removable tooling is a wash out mandrel formed of salt.

17. The axle assembly of claim 13, wherein the cooling conduit is at least partially formed by a foam insert when the housing is cast.

18. The axle assembly of claim 13, wherein the first and second fluids are different.

19. The axle assembly of claim 13, wherein the cooling conduit is at least partially defined by a plurality of U-shaped bends.

20. The axle assembly of claim 13, wherein the heat exchanger is integrated into a multi-fluid heat exchanger, the multi-fluid heat exchanger also facilitating heat rejection from an engine coolant.

21. The axle assembly of claim 20, wherein the multi-fluid heat exchanger is also operable for facilitating heat rejection from an automatic transmission fluid.

22. The axle assembly of claim 13, wherein the heat exchanger includes a plurality of conduits and a plurality of fins, the conduits conducting heat from the second fluid to the fins, the fins rejecting heat to supply of air approximate the fins.

23. The axle assembly of claim 13, wherein the cooling conduit is at least partially formed by a tube assembly that is cast into the housing.

24. A method for cooling an axle assembly, the method comprising the steps of:

providing a housing having a wall member that defines a cavity and at least one cooling conduit, the cavity having a first fluid contained therein, the cooling conduit being wholly formed in the wall member and having a second fluid contained therein;

positioning a differential assembly within the cavity; and circulating the second fluid through the cooling conduit to extract heat from the housing.

* * * * *